United States Patent
Zhao et al.

(10) Patent No.: US 11,930,496 B2
(45) Date of Patent: Mar. 12, 2024

(54) METHOD OF PROCESSING TRANSMISSION, TERMINAL AND NETWORK DEVICE

(71) Applicant: DATANG MOBILE COMMUNICATIONS EQUIPMENT CO., LTD., Beijing (CN)

(72) Inventors: Yali Zhao, Beijing (CN); Pierre Bertrand, Beijing (CN); Li Chen, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 214 days.

(21) Appl. No.: 17/427,600

(22) PCT Filed: Jan. 21, 2020

(86) PCT No.: PCT/CN2020/073480
§ 371 (c)(1),
(2) Date: Jul. 30, 2021

(87) PCT Pub. No.: WO2020/156375
PCT Pub. Date: Aug. 6, 2020

(65) Prior Publication Data
US 2022/0124764 A1   Apr. 21, 2022

(30) Foreign Application Priority Data
Jan. 31, 2019   (CN) .......................... 201910100274.0

(51) Int. Cl.
*H04W 72/12* (2023.01)
*H04L 1/18* (2023.01)
(Continued)

(52) U.S. Cl.
CPC ....... *H04W 72/1273* (2013.01); *H04L 1/1812* (2013.01); *H04L 5/0053* (2013.01); *H04W 72/535* (2023.01); *H04W 72/54* (2023.01)

(58) Field of Classification Search
CPC ..... H04W 72/12; H04W 72/04; H04W 28/02; H04L 1/00; H04L 1/008; H04L 1/18
See application file for complete search history.

(56) References Cited

U.S. PATENT DOCUMENTS

2018/0176974 A1   6/2018   Fujishiro et al.
2018/0279168 A1 *  9/2018   Jheng ...................... H04L 5/001
(Continued)

FOREIGN PATENT DOCUMENTS

CN   104333908 A      2/2015
CN   107241164 A  * 10/2017   ........... H04L 1/0023
(Continued)

OTHER PUBLICATIONS

Supplementary European Search Report for European Patent Application 20748754.7 dated Feb. 25, 2022.
(Continued)

*Primary Examiner* — Phong La
(74) *Attorney, Agent, or Firm* — Ladas & Parry, LLP (57) ABSTRACT

A method of processing transmission, a terminal and a network device are provided. The method of processing transmission applied to a terminal includes: when a MAC layer of the terminal receives a data packet from a first logical channel and data packets from the first logical channel correspond to K first processes, starting a first timer or a first counter for each first process, where k≥1; triggering starting of a second timer when the first timer expires or the first counter reaches a first preset value; performing a target operation when at least one second timer is running, wherein the target operation includes one of following: sending first
(Continued)

notification information to a network device, where the first notification information is used to instruct the network device to perform transmission processing on the first logical channel; or performing the transmission processing on the first logical channel.

17 Claims, 4 Drawing Sheets

(51) Int. Cl.
*H04L 1/1812* (2023.01)
*H04L 5/00* (2006.01)
*H04W 72/1273* (2023.01)
*H04W 72/50* (2023.01)
*H04W 72/54* (2023.01)

(56) References Cited

U.S. PATENT DOCUMENTS

| | | | | |
|---|---|---|---|---|
| 2018/0279262 | A1* | 9/2018 | Babaei | H04L 1/1848 |
| 2018/0376457 | A1* | 12/2018 | Tseng | H04L 1/16 |
| 2019/0098533 | A1* | 3/2019 | Babaei | H04L 1/08 |
| 2019/0349139 | A1* | 11/2019 | Park | H04W 80/08 |
| 2020/0084659 | A1* | 3/2020 | Pan | H04W 76/15 |
| 2020/0084796 | A1 | 3/2020 | Zhao et al. | |
| 2020/0163140 | A1* | 5/2020 | Mochizuki | H04W 16/32 |
| 2022/0124764 | A1* | 4/2022 | Zhao | H04W 72/1273 |

FOREIGN PATENT DOCUMENTS

| | | | | |
|---|---|---|---|---|
| CN | 107241164 A | | 10/2017 | |
| CN | 108271270 A | | 7/2018 | |
| EP | 3605920 B1 | * | 10/2021 | ........... H04L 5/0001 |
| KR | 20190098004 | * | 5/2018 | |
| KR | 20190098004 A | * | 8/2019 | |
| WO | WO-2020033395 A1 | * | 2/2020 | .......... H04W 74/004 |

OTHER PUBLICATIONS

"LTE MAC, RLC, and PDCP," Mar. 31, 2018, Bong Youl (Brian) Cho; Retrieved from the Internet: URL: https://www.researchgate.net/profile/Hassan-Al-Khateeb/publication/323703667_LTE_MAC_RLC_and_PDCP/links/5aa6b7464585152d7665b8c4/LTE-MAC-RLC-and-PDCP.pdf.

LG Electronics Inc., "Scheduling enhancement for TSN traffic", R2-1818358, 3GPP TSG-RAN WG2 Meeting #104, Spokane, USA, Nov. 12-16, 2018, all pages.

International Search Report from PCT/CN2020/073480, dated Apr. 17, 2020, with English translation from WIPO, all pages.

Written Opinion of the International Searching Authority from PCT/CN2020/073480, dated Apr. 17, 2020, with English translation from WIPO, all pages.

International Preliminary Report on Patentability from PCT/CN2020/073480, dated Jul. 27, 2021, with English translation from WIPO, all pages.

* cited by examiner

METHOD OF PROCESSING TRANSMISSION, TERMINAL AND NETWORK DEVICE

CROSS-REFERENCE TO RELATED APPLICATIONS

This application is a U.S. national phase application of a PCT Application No. PCT/CN2020/073480 filed on Jan. 21, 2020, which claims priority to a Chinese Patent Application No. 201910100274.0 filed on Jan. 31, 2019, the disclosures of which are incorporated in their entireties by reference herein.

TECHNICAL FIELD

The present disclosure relates to the field of communications technologies, in particular, relates to a method of processing transmission, a terminal and a network device.

BACKGROUND

For an Industrial Internet of Things (HOT) service, a standard TR 22.804 has a survival time requirement.

The survival time means that after transmission of X (X>=1) messages at a service layer fails, the service layer enters the survival time, and correct transmission of service messages needs to be recovered as soon as possible within the survival time. Therefore, it is required that a lower layer can improve reliability of service transmission. In the related art, there is no clear solution for how to guarantee that the lower layer can improve reliability of data transmission as soon as possible after the service layer enters the survival time.

SUMMARY

The embodiments of the present disclosure provide a method of processing transmission, a terminal and a network device, so to solve the problem that when a service enters a survival time, a lower layer does not improve reliability of data transmission, and the service cannot be guaranteed to be correctly transmitted, communication reliability cannot be ensured.

In order to solve the above technical problem, an embodiment of the present disclosure provides a method of processing transmission applied to a terminal. This method includes when a Media Access Control (MAC) layer of the terminal receives a data packet from a first logical channel and data packets from the first logical channel correspond to K first processes, starting a first timer or a first counter for each of the K first processes, where k≥1; triggering starting of a second timer when the first timer expires or the first counter reaches a first preset value; performing a target operation when at least one second timer is running, wherein the target operation includes one of following: sending first notification information to a network device, where the first notification information is used to instruct the network device to perform transmission processing on the first logical channel; or performing the transmission processing on the first logical channel.

Specifically, the first logical channel is a logical channel having a survival time requirement.

Further, a timing duration of the first timer is determined by one of the following: determining according to a Packet Delay Budget corresponding to the first logical channel; determining according to a core network latency and an end-to-end latency corresponding to the first logical channel; or determining according to the core network latency, the end-to-end latency and jitter corresponding to the first logical channel.

Further, a condition of restarting the first timer includes at least one of following conditions: receiving, by the terminal, a Hybrid Automatic Repeat reQuest (HARD) acknowledgement response feedback for the first process; if the data packet is transmitted using a pre-configured resource, a timer for the pre-configured resource expires; or receiving, by the terminal, a Physical Downlink Control Channel (PDCCH) scheduling signaling for the first process, wherein a new data indicator (NDI) included in the PDCCH scheduling signaling is inversed.

Further, a count value length of the first counter is determined by one of the following: determining according to a packet delay budget corresponding to the first logical channel; determining according to a core network latency and an end-to-end latency corresponding to the first logical channel; or determining according to the core network latency, the end-to-end latency and jitter corresponding to the first logical channel.

Further, the first counter is maintained based on a transport block of the first process, and manners for the maintenance include at least one of following: an initial value of the first counter is 0, and a value of the first counter is incremented by 1 every time a transport block of the first process is transmitted once; or an initial value of the first counter is M, and a value of the first counter is decremented by 1 every time a transport block of the first process is transmitted once, wherein M is a first preset value, M≥1.

Optionally, performing the transmission processing on the first logical channel includes at least one of the following: activating a Packet Data Convergence Protocol layer data replication function for the first logical channel; or starting uplink repetitive transmissions.

Optionally, when the target operation is to send the first notification information to the network device, after performing the target operation while at least one second timer is running, the method further includes: sending second notification information to the network device if all second timers stop running; wherein the second notification information is used for instructing the network device to stop performing the transmission processing on the first logical channel.

The embodiments of the present disclosure further provide a method of processing transmission, applied to a network device. The method includes: receiving first notification information sent by a terminal; performing transmission processing on a first logical channel of the terminal according to the first notification information.

Specifically, performing the transmission processing on the first logical channel of the terminal includes at least one of the following: notifying the terminal to activate a Packet Data Convergence Protocol layer data replication function for the first logical channel; starting uplink repetitive transmissions; adopting a lower Modulation and Coding Scheme (MCS) level; or increasing a transmission power.

Optionally, after performing the transmission processing on the first logical channel of the terminal according to the first notification information, the method further includes: receiving second notification information sent by the terminal; stopping the transmission processing on the first logical channel of the terminal according to the second notification information.

The embodiments of the present disclosure further provide a method of processing transmission, applied to a network device. The method includes: when a Media Access Control (MAC) layer of a network device receives a data packet from a second logical channel and data packets from the second logical channel correspond to H second processes, starting a third timer or a second counter for each of the second processes, wherein, H≥1; triggering starting of a fourth timer when the third timer expires or the second counter reaches a second preset value; performing transmission processing on the second logical channel when at least one fourth timer is running.

Specifically, the second logical channel is a logical channel having a survival time requirement.

Further, a timing duration of the third timer is determined by one of the following: determining according to a Packet Delay Budget (PDB) corresponding to the second logical channel; determining according to a core network latency and an end-to-end latency corresponding to the second logical channel; or determining according to the core network latency, the end-to-end latency and a jitter corresponding to the second logical channel.

Further, a condition of restarting the third timer includes at least one of the following conditions: receiving, by the network device, a Hybrid Automatic Repeat reQuest (HARD) acknowledgement response feedback for the second process; if a data packet is transmitted using a pre-configured resource, a timer for the pre-configured resource expires; or obtaining a Physical Downlink Control Channel (PDCCH) scheduling signaling for the second process, wherein a new data indicator (NDI) included in the PDCCH scheduling signaling is inversed.

Further, a count length of the second counter is determined by one of the following: determining according to a packet delay budget corresponding to the second logical channel; determining according to a core network latency and an end-to-end latency corresponding to the second logical channel; or determining according to the core network latency, the end-to-end latency and the jitter corresponding to the second logical channel.

Further, the second counter is maintained based on a transport block of the second process, and manners for the maintenance include at least one of the following: an initial value of the second counter is 0, and a value of the second counter is incremented by 1 every time a transport block of the second process is transmitted once; or an initial value of the second counter is N, and a value of the second counter is decremented by 1 every time a transport block of the second process is transmitted once, wherein N is a second preset value, N≥1.

Further, performing the transmission processing on the second logical channel includes at least one of the following: activating a Packet Data Convergence Protocol layer data replication function for the second logical channel; starting downlink repetitive transmissions; adopting a lower Modulation and Coding Scheme (MCS) level; or increasing a transmission power.

The embodiments of the present disclosure further provide a terminal. The terminal includes a storage, a processor and a program stored on the storage and executable by the processor, wherein the processor is configured to execute the program to implement the following steps: when a Media Access Control (MAC) layer of the terminal receives a data packet from a first logical channel and data packets from the first logical channel correspond to K first processes, starting a first timer or a first counter for each of the K first processes, where k≥1; triggering starting of a second timer when the first timer expires or the first counter reaches a first preset value; performing a target operation when at least one second timer is running, wherein the target operation includes one of following: sending first notification information to a network device, where the first notification information is used to instruct the network device to perform transmission processing on the first logical channel; or performing the transmission processing on the first logical channel.

Specifically, the first logical channel is a logical channel having a survival time requirement.

Further, a timing duration of the first timer is determined by one of the following: determining according to a Packet Delay Budget corresponding to the first logical channel; determining according to a core network latency and an end-to-end latency corresponding to the first logical channel; or determining according to the core network latency, the end-to-end latency and jitter corresponding to the first logical channel.

Further, a condition of restarting the first timer includes at least one of following conditions: receiving, by the terminal, a Hybrid Automatic Repeat reQuest (HARD) acknowledgement response feedback for the first process; if the data packet is transmitted using a pre-configured resource, a timer for the pre-configured resource expires; or receiving, by the terminal, a Physical Downlink Control Channel (PDCCH) scheduling signaling for the first process, wherein a new data indicator (NDI) included in the PDCCH scheduling signaling is inversed.

Further, a count length of the first counter is determined by one of the following: determining according to a packet delay budget corresponding to the first logical channel; determining according to a core network latency and an end-to-end latency corresponding to the first logical channel; or determining according to a core network latency, an end-to-end latency and jitter corresponding to the first logical channel.

Further, the first counter is maintained based on a transport block of the first process, and manners for the maintenance include at least one of following: an initial value of the first counter is 0, and a value of the first counter is incremented by 1 every time a transport block of the first process is transmitted once; or an initial value of the first counter is M, and a value of the first counter is decremented by 1 every time a transport block of the first process is transmitted once, wherein M is a first preset value, M≥1.

Optionally, the processor is configured to execute the program to implement at least one of the following: activating a Packet Data Convergence Protocol layer data replication function for the first logical channel; or starting uplink repetitive transmissions.

Optionally, when the target operation is to send the first notification information to the network device, the processor is configured to execute the program to implement following: sending second notification information to the network device if all second timers stop running; wherein the second notification information is used for instructing the network device to stop performing the transmission processing on the first logical channel.

The embodiments of the present disclosure further provide a network device. The network device includes a transceiver, a storage, a processor and a program stored on the storage and executable by the processor, wherein the processor is configured to execute the program to implement the following steps: receiving, through the transceiver, first notification information sent by a terminal; performing transmission processing on a first logical channel of the terminal according to the first notification information.

Specifically, when the processor executes the program, the processor implements at least one of the following: notifying the terminal to activate a Packet Data Convergence Protocol layer data replication function for the first logical channel; starting uplink repetitive transmissions; adopting a lower Modulation and Coding Scheme (MCS) level; or increasing a transmission power.

Optionally, when the processor executes the program, the processor implements the following: receiving, through the transceiver, second notification information sent by the terminal; stopping the transmission processing on the first logical channel of the terminal according to the second notification information.

The embodiments of the present disclosure further provide a network device. The network device includes: a transceiver, a storage, a processor and a program stored on the storage and executable by the processor, wherein the processor is configured to execute the program to implement the following steps: when a Media Access Control (MAC) layer of the network device receives a data packet from a second logical channel and data packets from the second logical channel correspond to H second processes, starting a third timer or a second counter for each of the second processes, wherein, H≥1; triggering starting of a fourth timer when the third timer expires or the second counter reaches a second preset value; performing transmission processing on the second logical channel when at least one fourth timer is running.

Specifically, the second logical channel is a logical channel having a survival time requirement.

Further, a timing duration of the third timer is determined by one of the following: determining according to a Packet Delay Budget corresponding to the second logical channel; determining according to a core network latency and an end-to-end latency corresponding to the second logical channel; or determining according to a core network latency, a end-to-end latency and a jitter corresponding to the second logical channel.

Further, a condition of restarting the third timer includes at least one of the following conditions: receiving, by the network device, a Hybrid Automatic Repeat reQuest (HARD) acknowledgement response feedback for the second process; if a data packet is transmitted using a pre-configured resource, a timer for the pre-configured resource expires; or obtaining a Physical Downlink Control Channel (PDCCH) scheduling signaling for the second process, wherein a new data indicator (NDI) included in the PDCCH scheduling signaling is inversed.

Further, a count length of the second counter is determined by one of the following: determining according to a packet delay budget corresponding to the second logical channel; determining according to a core network latency and an end-to-end latency corresponding to the second logical channel; or determining according to a core network latency, an end-to-end latency and a jitter corresponding to the second logical channel.

Further, the second counter is maintained based on a transport block of the second process, and manners for the maintenance include at least one of the following: an initial value of the second counter is 0, and a value of the second counter is incremented by 1 every time a transport block of the second process is transmitted once; or an initial value of the second counter is N, and a value of the second counter is decremented by 1 every time a transport block of the second process is transmitted once, wherein N is a second preset value, N≥1.

Specifically, when the processor executes the program, the processor implements at least one of the following: activating a Packet Data Convergence Protocol layer data replication function for the second logical channel; starting downlink repetitive transmissions; adopting a lower Modulation and Coding Scheme (MCS) level; or increasing a transmission power.

The embodiments of the present disclosure further provide a computer-readable storage medium. The medium includes a computer program stored on the computer-readable storage medium, wherein when the computer program is executed by a processor, the processor implements the method of processing transmission provided above.

The embodiments of the present disclosure further provide a terminal. The terminal includes a first starting module configured for, when a Media Access Control (MAC) layer of the terminal receives a data packet from a first logical channel and data packets from the first logical channel correspond to K first processes, starting a first timer or a first counter for each of the K first processes, where k≥1; a first triggering module configured for triggering starting of a second timer when the first timer expires or the first counter reaches a first preset value; a first performing module configured for performing a target operation when at least one second timer is running, wherein the target operation includes one of following: sending first notification information to a network device, where the first notification information is used to instruct the network device to perform transmission processing on the first logical channel; or performing the transmission processing on the first logical channel.

The embodiments of the present disclosure further provide a network device. The network device includes a first receiving module configured for receiving first notification information sent by a terminal; a first processing module configured for performing transmission processing on a first logical channel of the terminal according to the first notification information.

The embodiments of the present disclosure further provide a network device. The network device includes a second starting module configured for, when a Media Access Control (MAC) layer of a network device receives a data packet from a second logical channel and data packets from the second logical channel correspond to H second processes, starting a third timer or a second counter for each of the second processes, wherein, H≥1; a second triggering module configured for triggering starting of a fourth timer when the third timer expires or the second counter reaches a second preset value; a second performing module configured for performing transmission processing on the second logical channel when at least one fourth timer is running.

Beneficial effects of the present disclosure are as follow.

In the above technical solutions, when a first timer expires or a first counter reaches a first preset value, a second timer is triggered to start, and when the second timer is running, transmission processing is performed on the first logical channel, and by means of the transmission processing, reliability of data transmission is improved, thereby ensuring that a service is correctly transmitted, and communication reliability is ensured.

DETAILED DESCRIPTION

In order to make objective, technical solutions and advantages of the present disclosure more clear, the present disclosure will be described in detail with reference to drawings and specific embodiments.

First, some concepts mentioned in the embodiments of the present disclosure are explained as follows.

A Fifth Generation (5G) New Radio (NR) system mainly supports three types of services: enhanced Mobile Broadband (eMBB); massive Machine Type Communications (mMTC); and Ultra-Reliable and Low Latency Communications (URLLC).

In essence, an Industrial Internet of Things (IIOT) service generally requires high reliability and low delay, and can be considered to belong to the URLLC service among the three types of services in 5G NR.

For the IIOT service, TR 22.804 has survival time requirement. The survival time is a maximum time duration, capable of being tolerated by the service layer, during which an expected message is not received.

For a receiving end, if an expected message cannot be received within a specific time (a minimum of which is the sum of an end-to-end delay, a jitter, and a survival time), then the service will be considered to be unavailable.

For an IIOT service, there is no clear solution for how to ensure that a lower layer can improve the reliability of data transmission as soon as possible after a service enters the survival time.

In order to address such problem that after a service enter the survival time, the lower layer does not improve the reliability of data transmission, correct transmission of the service cannot be guaranteed, and reliability of communication cannot be ensured, a method of processing transmission, a terminal and a network device are provided.

Figure 1:
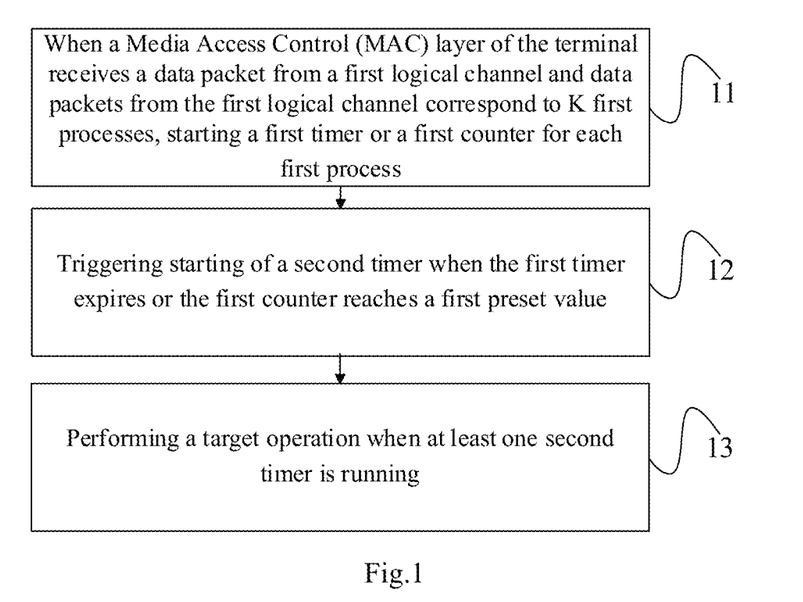
FIG. 1 is a flowchart of a method of processing transmission applied to a terminal side according to an embodiment of the present disclosure.

As shown in FIG. 1, the method of processing transmission according to an embodiment of the present disclosure. The method is applied to a terminal, the method includes Steps 11 to 13.

Step 11: when a Media Access Control (MAC) layer of a terminal receives a data packet from a first logical channel and data packets from the first logical channel correspond to K first processes, starting a first timer or a first counter for each of the K first processes.

It should be noted that, the data packet according to the embodiment of the present disclosure refers to an uplink data packet, wherein, K≥1. Specifically, when the terminal performs data transmission, a plurality of processes may be used to transmit data packets of the same logical channel simultaneously. The processes herein refer to at least one process, and each process corresponds to a first timer or a first counter. It should be noted that, in this embodiment, the first logical channel, the first process, the first timer, and the first counter are only used to be differentiated from a second logical channel, a second process, a second timer, a third timer, and a fourth timer, but not constitute a particular limitation to a respective component.

Step 12: triggering starting of a second timer when the first timer expires or the first counter reaches a first preset value.

It should be noted here that a second timer is started whenever a first timer expires or a first counter reaches a first preset value (which is a preconfigured threshold value), and each process also corresponds to a second timer.

Step 13: performing a target operation when at least one second timer is running.

Specifically, the target operation includes one of the following A11 to A13.

A11. sending first notification information to a network device, where the first notification information is used to instruct the network device to perform transmission processing on the first logical channel.

It should be noted that, performing transmission processing on the first logical channel means performing processing on the first logical channel to improve reliability of data transmission, that is, performing transmission processing on the first logical channel to improve data transmission reliability of the first logical channel.

It also should be noted that, when the terminal cannot improve the reliability of data transmission of the first logical channel through an operation of the terminal only, the network device needs to perform transmission processing to improve the reliability of data transmission of the first logical channel. In this case, the terminal needs to send notification information to the network device to inform the network device to perform the transmission processing. Specifically, the network device performs transmission processing on the first logical channel of the terminal after receiving the notification message, sent by the terminal, that transmission processing is required. Specifically, manners for the processing may include at least one of the following A111 to A114.

A111: notifying the terminal to activate a Packet Data Convergence Protocol layer data duplication function (PDCP duplication) for the first logical channel.

By activating the PDCP duplication for the first logical channel, the reliability of data transmission can be improved.

A112: starting uplink repetitive transmissions.

The reliability of data transmission can be improved by using a plurality of uplink repetitive transmissions, such as repetition or bundle of transmissions.

A113: adopting a lower Modulation and Coding Scheme ((MCS) level.

It should be noted that the reliability of data transmission can be improved by adopting a lower MCS level for the first logical channel. For example, 64QAM is used originally, 16QAM is used currently; compared with 64QAM, the 16QAM is a lower MCS level.

A114: increasing a transmission power.

When the terminal transmits data of the first logical channel, the transmission power of the terminal is increased, thereby improving the reliability of data transmission.

A12: performing transmission processing on the first logical channel.

It should be noted that, when the terminal can improve the data transmission reliability of the first logical channel through the operation of the terminal only, specific manners of the processing includes at least one of the following A121 and A122.

A121: activating a Packet Data Convergence Protocol layer data replication function (PDCP replication) for the first logical channel;

A122: starting uplink repetitive transmissions.

Further, it should be noted that the first logical channel in the embodiment of the present disclosure refers to a logical channel having a survival time requirement.

Further, when the first timer is started by the terminal, a timing duration of the first timer is determined by one of the following B11 to B13.

B11: determining according to a Packet Delay Budget (PDB) corresponding to the first logical channel;

B12: determining according to a core network latency and an end-to-end latency corresponding to the first logical channel; or B13: determining according to the core network latency, the end-to-end latency and jitter corresponding to the first logical channel.

Further, since the first timer may not operate all the time under all conditions, the first timer may be restarted when a certain condition is satisfied. Specifically, the restarting condition of the first timer includes at least one of the following conditions B21 to B23.

B21: receiving, by the terminal, a Hybrid Automatic Repeat reQuest (HARQ) acknowledgement response feedback for the first process.

For example, when the terminal receives the HARQ acknowledgement response feedback for process 1 from the network device, it indicates that data of the process 1 is correctly received by the network device, and therefore, the first timer for the process 1 needs to be restarted to restart timing monitoring.

B22: if a data packet is transmitted using a pre-configured resource, a timer for the pre-configured resource expires.

It should be noted that the timer for the pre-configured resource is a time duration for waiting for retransmission scheduling of data transmitted using the pre-configured resource, and if the timer for the pre-configured resource expires, it is considered that service data transmitted using the pre-configured resource is correctly received by the network device, and therefore, the first timer for the process needs to be restarted to start timing monitoring again.

B23: receiving, by the terminal, a Physical Downlink Control Channel (PDCCH) scheduling signaling for the first process, wherein a new data indicator (NDI) included in the PDCCH scheduling signaling is inversed.

It should be noted that since NDI contains only 1 bit, NDI inversion means that data represented by the 1 bit is changed from 0 to 1 or from 1 to 0. If NDI is inversed, then it means that data transmitted previously using the first process is correctly received by the network device. Thus, the first timer for the first process needs to be restarted to start timing monitoring again.

Further, when the first counter is activated by the terminal, a count value length of the first counter is determined by one of the following ways C11-C13.

C11: determining according to a packet delay budget corresponding to the first logical channel;

C12: determining according to a core network latency and an end-to-end latency corresponding to the first logical channel; or C13: determining according to the core network latency, the end-to-end latency and jitter corresponding to the first logical channel.

Specifically, the first counter is maintained based on a transport block of the first process, and manners for the maintenance include at least one of the following C21-C22.

C21: an initial value of the first counter is 0, and a value of the first counter is incremented by 1 every time a transport block of the first process is transmitted once; or C22: an initial value of the first counter is M, and a value of the first counter is decremented by 1 every time a transport block of the first process is transmitted once, wherein M is a first preset value, M≥1.

It should be noted that, one of the above two manners may be selected for usage, and a specific manner selected by the terminal may be configured by the network device, or may be specified by a protocol.

It should also be noted that, for a terminal that cannot improve the reliability of data transmission of the first logical channel through the operation of the terminal only, after the network device performs transmission processing on the first logical channel, the network device does not always perform the transmission processing on the first logical channel, and when the transmission reliability of the first logical channel can be ensured, it is unnecessary to perform the transmission processing on the first logical channel, as an optimized manner. A specific implementation manner of the embodiment of the present disclosure is that after sending the first notification information to the network device, sending second notification information to the network device if all second timers for the first logical channel of the terminal stop running; wherein the second notification information is used for instructing the network device to stop performing the transmission processing on the first logical channel.

For example, a process 1, a process 2, and a process 3 respectively correspond to a timer A1, a timer B1, and a timer C1, and the process 1, the process 2 and the process 3 also correspond to a timer A2, a timer B2 and a timer C2, respectively; the terminal uses the process 1, the process 2 and the process 3 to simultaneously transmit data packets of a logical channel 1. When a MAC layer receives the data packets, it starts the timer A1, the timer B1 and the timer C1 corresponding to the process 1, the process 2 and the process 3, and when the timer A1 expires, the terminal starts the timer A2 corresponding to the process 1, and A2 is running, the terminal needs to send the first notification information to the network device, and subsequently, the timer B2 is also running; and then the timer A2 and the timer B2 stop running due to successful transmission of data; at this time, all of the timer A2, the timer B2 and the timer C2 are not in a running state, the terminal needs to send the second notification information to the network device, so that the network device stops transmission processing on the logical channel 1.

The following is a specific description of uplink data transmission.

Step S11: maintaining, by a terminal, a first timer (for example, a timer T1) or a first counter (for example, a counter 1) for a specific logical channel (for example, a certain logical channel) of the terminal;

It should be noted that the specific logical channel is a logical channel having a survival time requirement, and may be determined based on a quality of service (QoS) parameter corresponding to the logical channel.

When a Media Access Control (MAC) layer of the terminal receives a new data packet for a specific logical channel of the terminal, a timer T1 or a Counter 1 is started for a process containing the data packet.

A length of the timer T1 or the Counter 1 is determined by one of the following manners:

S111: determining according to a PDB corresponding to the specific logical channel;

S112: determining according to a core network latency and an end-to-end latency corresponding to the specific logical channel;

S113: determining according to the core network latency, the end-to-end latency and the jitter corresponding to the specific logical channel.

Optionally, if the terminal uses the timer T1, then a condition of restarting the timer T1 includes, but is not limited to: receiving a HARQ ACK feedback for a process corresponding to the data packet; if the data packet is transmitted using a pre-configured resource, a corresponding timer (configuredGrantTimer) for the pre-configured resource expires; receiving a PDCCH scheduling signaling for a process corresponding to the data packet, wherein a NDI included in the PDCCH scheduling signaling is inversed.

Optionally, if the Counter 1 is used, then the counter 1 is maintained based on a Transport Block (TB) of a process, and manners for the maintenance include, but are not limited to, at least one of the following: an initial value of the counter is 0, and a value of the Counter is incremented by 1 every time a TB of the process is transmitted once; an initial value of the Counter 1 is M, and a value of the Counter 1 is decremented by 1 every time a TB of the process is transmitted once.

Step S12: processing when the timer T1 expires or the Counter 1 reaches a preset value.

When the timer T1 expires or the Counter 1 reaches a preset value, a second timer (e.g., a timer T2) is triggered to be started. As long as any one of timers T2 is running, processing for improving the reliability of data transmission needs to be performed on the specific logical channel.

The processing for improving the reliability of data transmission for the specific logical channel includes, but is not limited to:

S121: the terminal activates the PDCP data replication function and/or enables uplink repetitive transmissions on itself; or S122: for uplink, a data transmission control node is in the network device (that is, the terminal cannot improve the reliability of data transmission of the first logical channel through the operation of the terminal per se), the terminal also needs to notify, through a signaling, the network side device to perform special processing when performing data transmission control;

A specific condition for triggering the notification includes, but is not limited to: an operation state change of the timer T2; it is necessary to consider all the timers T2 when judging whether an operation state of the timer T2 is changed. For example, if the terminal does not have a timer T2 currently running, and suddenly a timer T2 starts, the terminal needs to notify the network device through the signaling, the network device may perform a process of improving the reliability of data transmission of the specific logical channel by receiving the indication information of the terminal. For example, at least one of the following manners may be performed: notifying the terminal to activate PDCP duplication; enabling uplink repetitive transmissions, such as repetition or bundle of transmissions; adopting a lower MCS level; or increasing a transmission power.

It should also be noted that, when the terminal is changed from a condition that at least one timer T2 is currently running to a condition that no timer T2 is currently running, the terminal also needs to notify this to the network device, so that the network device stops the processing of improving the reliability of data transmission of the specific logical channel.

It should be noted that, after a service at a terminal side enters the survival time, the service can be quickly recovered by adopting manners of the embodiment of the present disclosure, thereby avoiding service transmission interruption and ensuring service transmission reliability.

Figure 2:
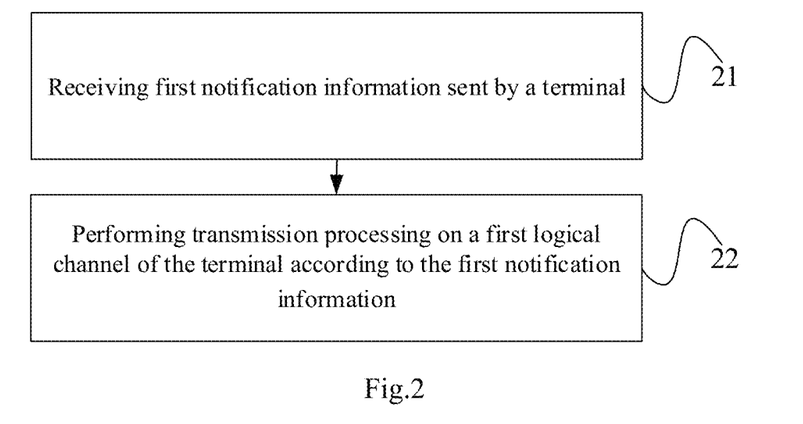
FIG. 2 is a first flowchart of a method of processing transmission applied to a network device side according to an embodiment of the present disclosure.

As shown in FIG. 2, a method of processing transmission of some embodiments of the present disclosure is applied to a network device. The network device includes Steps 21-22.

Step 21: receiving first notification information sent by a terminal.

Step 22: performing transmission processing on a first logical channel of the terminal according to the first notification message.

Specifically, implementation of the Step 22 includes at least one of the following: notifying the terminal to activate a Packet Data Convergence Protocol layer data replication function (PDCP replication) for the first logical channel; starting uplink repetitive transmissions; adopting a lower Modulation and Coding Scheme (MCS) level; or increasing a transmission power.

Optionally, after the Step 22, the method of processing transmission further includes: receiving second notification information sent by the terminal; stopping the transmission processing on the first logical channel of the terminal according to the second notification message.

All descriptions about the network device in the above embodiment are applicable to the embodiment of the method of processing transmission applied to the network device, and the same technical effect can be achieved.

Figure 3:
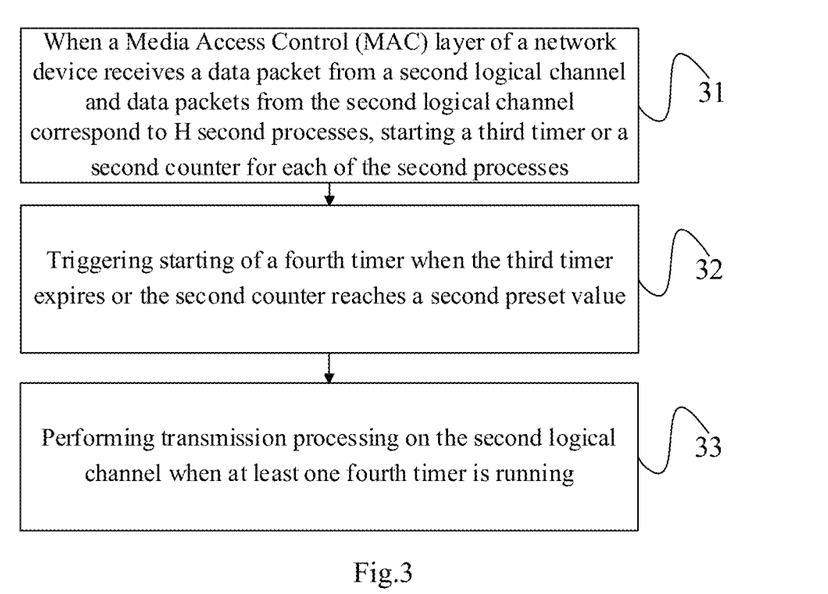
FIG. 3 is a second flowchart of a method of processing transmission applied to a network device side according to an embodiment of the present disclosure.

As shown in FIG. 3, a method of processing transmission according to some embodiments of the present disclosure is applied to a network device. The method includes Steps 31 to 33.

Step 31: when a Media Access Control (MAC) layer of a network device receives a data packet from a second logical channel and data packets from the second logical channel correspond to H second processes, starting a third timer or a second counter for each of the second processes.

It should be noted that, the data packet according to the embodiment of the present disclosure refers to a downlink data packet, wherein, H≥1. Specifically, when the network device performs data transmission, a plurality of processes may be used to transmit data packets of the same logical channel simultaneously. The processes herein refer to at least one process, and each process corresponds to a third timer or a second counter.

Step 32: triggering starting of a fourth timer when the third timer expires or the second counter reaches a second preset value.

It should be noted here that a fourth timer is started whenever a third timer expires or a second counter reaches a first preset value (which is a preconfigured threshold value), and each process also corresponds to a fourth timer.

Step 33: performing transmission processing on the second logical channel when at least one fourth timer is running.

It should be noted herein that as long as there is a fourth timer running, the network device needs to perform the transmission processing on the second logical channel.

Specifically, manners for the transmission processing on the second logical channel include at least one of the following D11 to D14.

D11: activating a Packet Data Convergence Protocol layer data duplication function (PDCP duplication) for the second logical channel.

By activating the PDCP duplication for the second logical channel, the reliability of data transmission can be improved.

D12: starting downlink repetitive transmissions.

The reliability of data transmission can be improved by using a plurality of downlink repetitive transmissions, such as repetition or bundle of transmissions.

D13: adopting a lower Modulation and Coding Scheme ((MCS) level.

It should be noted that the reliability of data transmission can be improved by adopting a lower MCS level for the second logical channel. For example, 64QAM is used originally, 16QAM is used currently; compared with 64QAM, the 16QAM is a lower MCS level.

D14: increasing a transmission power.

When the network device transmits data of the second logical channel, the transmission power of the network device is increased, thereby improving the reliability of data transmission.

Further, it should be noted that the second logical channel in the embodiment of the present disclosure refers to a logical channel having a survival time requirement.

Further, when the third timer is started by the network device, the timing duration of the third timer is determined by one of the following D21 to D23.

D21: determining according to a Packet Delay Budget (PDB) corresponding to the second logical channel;

D22: determining according to a core network latency and an end-to-end latency corresponding to the second logical channel; or D23: determining according to the core network latency, the end-to-end latency and a jitter corresponding to the second logical channel.

Further, since the third timer may not operate all the time under all conditions, the third timer may be restarted when a certain condition is satisfied. Specifically, the condition of restarting the third timer includes at least one of the following conditions D31 to D33.

D31: receiving, by the network device, a Hybrid Automatic Repeat reQuest (HARQ) acknowledgement response feedback for the second process.

For example, when the network device receives the HARQ acknowledgement response feedback for process 2, it indicates that data of the process 2 is correctly received by the terminal, and therefore, the third timer for the process 2 needs to be restarted to restart timing monitoring.

D32: if a data packet is transmitted using a pre-configured resource, a timer for the pre-configured resource expires.

It should be noted that the timer for the pre-configured resource is a time duration for waiting for retransmission scheduling of data transmitted using the pre-configured resource, and if the timer for the pre-configured resource expires, it is considered that service data transmitted using the pre-configured resource is correctly received by the terminal, and therefore, the third timer for the process needs to be restarted to start timing monitoring again.

D33: obtaining a Physical Downlink Control Channel (PDCCH) scheduling signaling for the second process, wherein a new data indicator (NDI) included in the PDCCH scheduling signaling is inversed.

It should be noted that since NDI contains only 1 bit, NDI inversion means that data represented by the 1 bit is changed from 0 to 1 or from 1 to 0. If NDI is inversed, then it means that data transmitted previously using the second process is correctly received by the terminal. Thus, the third timer for the second process needs to be restarted to start timing monitoring again.

Further, when the second counter is started by the terminal, a count value length of the second counter is determined by one of the following ways D41-D43.

D41: determining according to a packet delay budget corresponding to the second logical channel;

D42: determining according to a core network latency and an end-to-end latency corresponding to the second logical channel; or D43: determining according to the core network latency, the end-to-end latency and the jitter corresponding to the second logical channel.

Specifically, the second counter is maintained based on a transport block of the second process, and manners for the maintenance include at least one of the following D51-D52.

D51: an initial value of the second counter is 0, and a value of the second counter is incremented by 1 every time a transport block of the second process is transmitted once; or D52: an initial value of the second counter is N, and a value of the second counter is decremented by 1 every time a transport block of the second process is transmitted once, wherein N is a second preset value, N≥1.

It should be noted that, one of the above two manners may be selected for usage, and a specific manner selected by the network device may be determined by the network device per se, or may be agreed in a protocol.

For example, a process 1 and a process 2 respectively correspond to a timer C1 and a timer D1, and the process 1 and the process 2 also correspond to a timer C2 and a timer D2, respectively; the network device utilizes the process 1 and the process 2 to simultaneously transmit a data packet of the logical channel 2, and when the MAC layer receives the data packet, the timer C1 and the timer D1 corresponding to the process 1 and the process 2 respectively are started respectively, and when the timer C1 expires, the network device starts the timer C2 corresponding to the process 1, and the timer C2 runs. The network device needs to perform transmission processing on the logical channel 2.

The following is a specific description of downlink data transmission.

Step S21: maintaining, by a network device, a third timer (for example, a timer T1) or a second counter (for example, a Counter 1) for a specific logical channel (for example, a certain logical channel) of the terminal.

The network device may be a base station or a DU (Distributed Unit).

The specific logical channel is a logical channel having a survival time requirement, and may be determined based on a QoS parameter corresponding to the logical channel.

When a MAC layer of the network device receives a new data packet for a specific logical channel of the terminal, a timer T1 or a Counter 1 is started for a process containing the data packet.

A length of the timer T1 or the Counter 1 is determined by the following manners.

S211: determining according to a PDB corresponding to the specific logical channel;

S212: determining according to a core network latency and an end-to-end latency corresponding to the specific logical channel;

S213: determining according to the core network latency, the end-to-end latency and the jitter corresponding to the specific logical channel.

Optionally, if the network device uses the timer T1, then a condition of restarting the timer T1 includes, but is not limited to: receiving a HARQ ACK feedback for a process corresponding to the data packet; if the data packet is transmitted using a pre-configured resource, a corresponding timer for the pre-configured resource expires; obtaining a PDCCH scheduling signaling for a process corresponding to the data packet, wherein a NDI included in the PDCCH scheduling signaling is inversed.

Optionally, if the Counter 1 is used by the network device, then the Counter 1 is maintained based on a Transport Block (TB) of a process, and manners for the maintenance include, but are not limited to, at least one of the following: an initial value of the Counter is 0, and a value of the Counter is incremented by 1 every time a TB of the process is transmitted once; or an initial value of the Counter 1 is M, and a value of the Counter 1 is decremented by 1 every time a TB of the process is transmitted once.

Step S22: processing when the timer T1 expires or the Counter 1 reaches a preset value.

When the timer T1 expires or the Counter 1 reaches a preset value, a timer T2 is triggered to be started. As long as any one of timers T2 is running for the terminal, processing for improving the reliability of data transmission needs to be performed on the specific logical channel.

A data transmission control node for downlink is in the network device. The network device may directly perform the processing of improving the reliability of data transmission on the specific logical channel. The processing of improving the reliability of data transmission on the specific logical channel includes, but is not limited to, at least one of the following manners: activating PDCP duplication; starting downlink repetitive transmissions, such as repetition or bundle of transmissions; adopting a lower MCS; or increasing a transmission power.

It should be noted that, after a service on the network device side enters the survival time, the service can be quickly recovered by adopting the manners of the embodiment of the present disclosure, thereby avoiding service transmission interruption and ensuring service transmission reliability.

Figure 4:
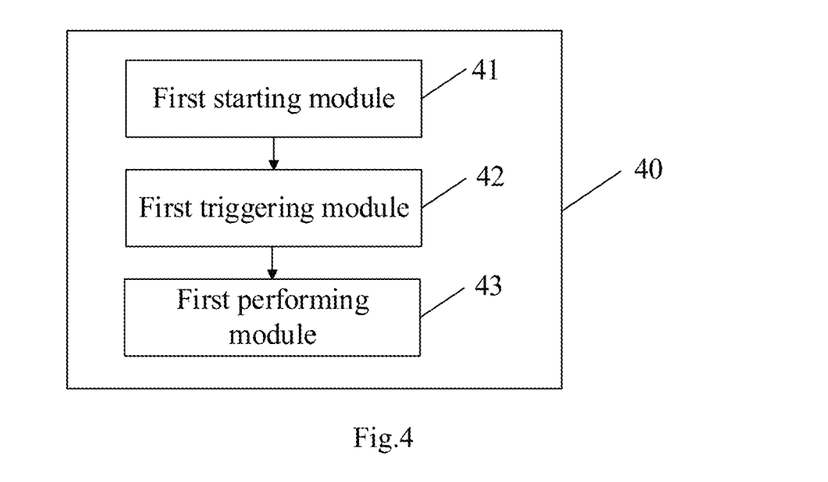
FIG. 4 shows a block diagram of a terminal according to an embodiment of the present disclosure.

As shown in FIG. 4, the embodiment of the present disclosure provides a terminal 40. The terminal 40 includes a first starting module 41, a first triggering module 42, and a first performing module 43.

The first starting module 41 is configured for, when a Media Access Control (MAC) layer of a terminal receives a data packet from a first logical channel and data packets from the first logical channel correspond to K first processes, starting a first timer or a first counter for each of the K first processes, wherein K≥1.

The first triggering module 42 is configured for triggering starting of a second timer when the first timer expires or the first counter reaches a first preset value.

The first performing module 43 is configured for performing a target operation when at least one second timer is running.

The target operation includes one of the following: sending first notification information to a network device, where the first notification information is used to instruct the network device to perform transmission processing on the first logical channel; or performing transmission processing on the first logical channel.

In particular, the first logical channel is a logical channel having a survival time requirement.

Further, a timing duration of the first timer is determined by one of the following: determining according to a Packet Delay Budget (PDB) corresponding to the first logical channel; determining according to a core network latency and an end-to-end latency corresponding to the first logical channel; or determining according to the core network latency, the end-to-end latency and jitter corresponding to the first logical channel.

Further, the condition of restarting the first timer includes at least one of the following conditions: receiving, by the terminal, a Hybrid Automatic Repeat reQuest (HARD) acknowledgement response feedback for the first process; if a data packet is transmitted using a pre-configured resource, a timer for the pre-configured resource expires; or receiving, by the terminal, a Physical Downlink Control Channel (PDCCH) scheduling signaling for the first process, wherein a new data indicator (NDI) included in the PDCCH scheduling signaling is inversed.

Further, a count value length of the first counter is determined by one of the following ways: determining according to a packet delay budget corresponding to the first logical channel; determining according to a core network latency and an end-to-end latency corresponding to the first logical channel; or determining according to the core network latency, the end-to-end latency and jitter corresponding to the first logical channel.

Specifically, the first counter is maintained based on a transport block of the first process, and manners for the maintenance include at least one of the following: an initial value of the first counter is 0, and a value of the first counter is incremented by 1 every time a transport block of the first process is transmitted once; or an initial value of the first counter is M, and a value of the first counter is decremented by 1 every time a transport block of the first process is transmitted once, wherein M is a first preset value, M≥1.

Optionally, the first performing module 43 executes at least one of the following: activating a Packet Data Convergence Protocol layer data replication function (PDCP replication) for the first logical channel; or starting uplink repetitive transmissions.

Optionally, when the target operation is to send the first notification information to the network device, after the first performing module 43 performs the target operation when at least one second timer runs, the terminal further includes a sending module configured for sending second notification information to the network device if all second timers stop running; wherein the second notification information is used for instructing the network device to stop performing the transmission processing on the first logical channel.

It should be noted that, the embodiment of the terminal is a terminal corresponding to the method embodiment described above, and all implementations in the method embodiment are applicable to the embodiment of the terminal, and the same technical effect can be achieved.

Figure 5:
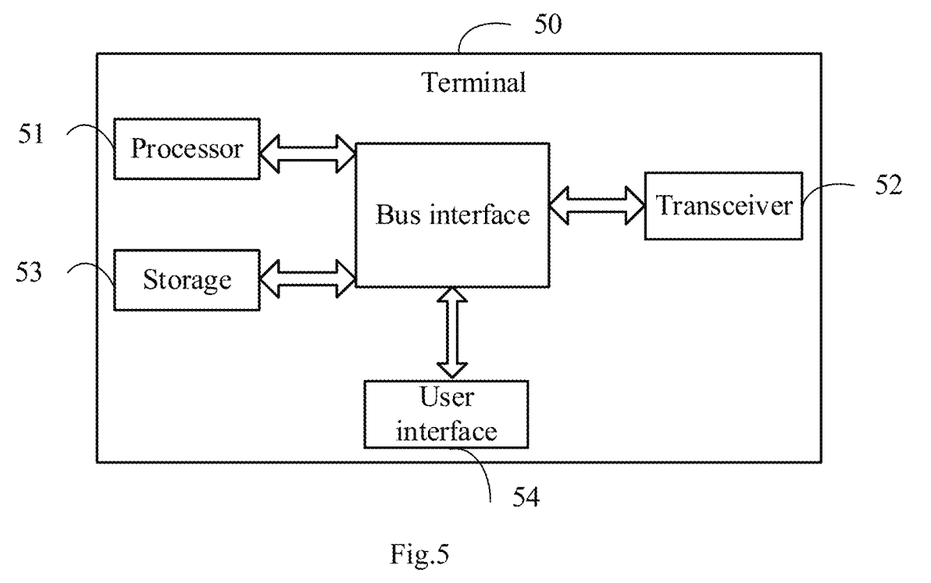
FIG. 5 shows a structural diagram of a terminal according to an embodiment of the present disclosure.

As shown in FIG. 5, an embodiment of the present disclosure also provides a terminal 50. The terminal 50 includes a processor 51, a transceiver 52, a storage 53, and a program stored on the storage 53 and executable by the processor 51, wherein, the transceiver 52 is connected to the processor 51 and the storage 53 via a bus interface, the processor 51 is configured for reading a program in the storage to perform the following: when a Media Access Control (MAC) layer of a terminal receives a data packet from a first logical channel and data packets from the first logical channel correspond to K first processes, starting a first timer or a first counter for each of the K first processes, wherein K≥1; triggering starting of a second timer when the first timer expires or the first counter reaches a first preset value; performing a target operation when at least one second timer is running.

The target operation includes one of the following: sending first notification information to a network device, where the first notification information is used to instruct the network device to perform transmission processing on the first logical channel; or performing transmission processing on the first logical channel.

It should be noted that in FIG. 5, a bus architecture may include any number of interconnected buses and bridges, and connects various circuits including one or more processors represented by the processor 51 and a storage represented by the storage 53. The bus architecture may also connect various other circuits such as peripherals, voltage regulators and power management circuits, which are well known in the art. Therefore, a detailed description thereof is omitted herein. A bus interface provides an interface. The transceiver 52 may be multiple elements, such as a transmitter and a receiver, to allow for communication with various other apparatuses on the transmission medium. For different terminals, a user interface 54 may be an interface capable of externally or internally connecting a required device, and the connected device includes, but is not limited to: a keypad, a display, a speaker, a microphone, a joystick and the like. The processor 51 is responsible for supervising the bus architecture and normal processing and the storage 53 may store the data being used by the processor 51 during operation.

In particular, the first logical channel is a logical channel having a survival time requirement.

Further, a timing duration of the first timer is determined by one of the following: determining according to a Packet Delay Budget (PDB) corresponding to the first logical channel; determining according to a core network latency and an end-to-end latency corresponding to the first logical channel; or determining according to the core network latency, the end-to-end latency and jitter corresponding to the first logical channel.

Further, the condition of restarting the first timer includes at least one of the following conditions: receiving, by the terminal, a Hybrid Automatic Repeat reQuest (HARD) acknowledgement response feedback for the first process; if a data packet is transmitted using a pre-configured resource, a timer for the pre-configured resource expires; or receiving, by the terminal, a Physical Downlink Control Channel (PDCCH) scheduling signaling for the first process, wherein a new data indicator (NDI) included in the PDCCH scheduling signaling is inversed.

Further, a count value length of the first counter is determined by one of the following ways: determining according to a packet delay budget corresponding to the first logical channel; determining according to a core network latency and an end-to-end latency corresponding to the first logical channel; or determining according to the core network latency, the end-to-end latency and jitter corresponding to the first logical channel.

Specifically, the first counter is maintained based on a transport block of the first process, and manners for the maintenance include at least one of the following: an initial value of the first counter is 0, and a value of the first counter is incremented by 1 every time a transport block of the first process is transmitted once; or an initial value of the first counter is M, and a value of the first counter is decremented by 1 every time a transport block of the first process is transmitted once, wherein M is a first preset value, M≥1.

Optionally, the processor is configured for executing the program to implement at least one of the following: activating a Packet Data Convergence Protocol layer data replication function (PDCP replication) for the first logical channel; or starting uplink repetitive transmissions.

Optionally, when the target operation is to send the first notification information to the network device, the processor is configured to execute the program to implement following: sending second notification information to the network device if all second timers stop running; wherein the second notification information is used for instructing the network device to stop performing the transmission processing on the first logical channel.

Embodiments of the present disclosure also provide a computer-readable storage medium. The computer-readable storage medium has stored thereon a computer program, wherein when the computer program is executed by a processor, the processor implements steps of a method of processing transmission applied to a terminal.

Figure 6:
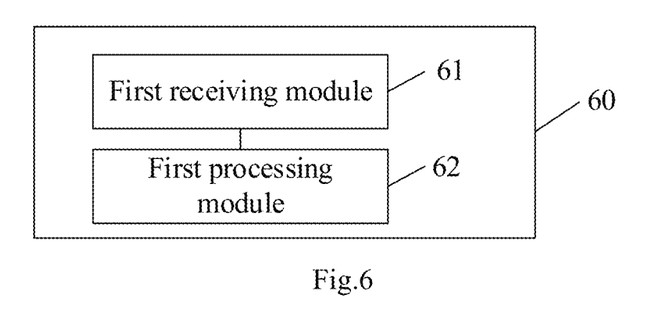
FIG. 6 shows a first block diagrams of a network device according to an embodiment of the present disclosure.

As shown in FIG. 6, an embodiment of the present disclosure provides a network device 60. The network device 60 includes a first receiving module 61 and a first processing module 62.

The first receiving module 61 is configured for receiving first notification information sent by a terminal.

The first processing module 62 is configured for performing transmission processing on a first logical channel of the terminal according to the first notification message.

Further, the processing module 62 performs at least one of the following: notifying the terminal to activate a Packet Data Convergence Protocol layer data replication function (PDCP replication) for the first logical channel; starting uplink repetitive transmissions; adopting a lower Modulation and Coding Scheme (MCS) level; or increasing a transmission power.

Optionally, after the processing module 62 performs transmission processing on the first logical channel of the terminal according to the first notification message, the network device 60 further includes: a second receiving module, configured for receiving second notification information sent by the terminal; and a second processing module, configured for stopping the transmission processing on the first logical channel of the terminal according to the second notification message.

It should be noted that the embodiment of the network device is a network device corresponding to the method embodiment described above, and all the implementations in the method embodiment are applicable to the embodiment of the network device. The same technical effect can be achieved.

Figure 7:
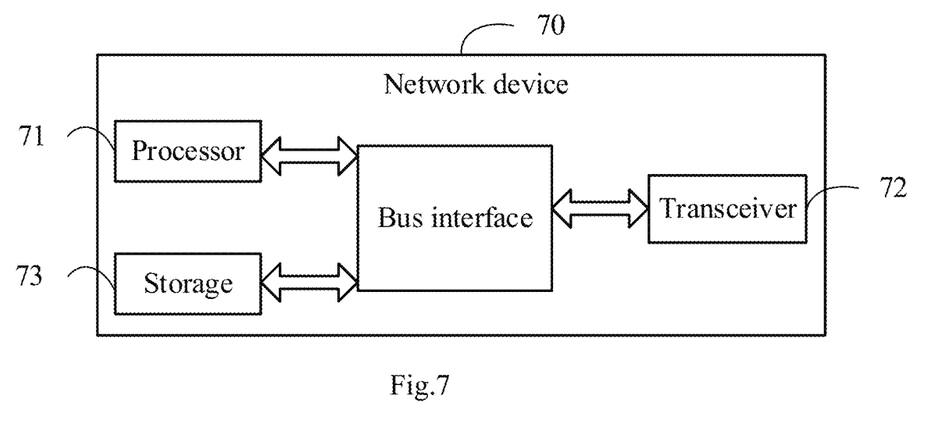
FIG. 7 shows a first structural diagram of a network device according to an embodiment of the present disclosure.

As shown in FIG. 7, the embodiment of the present disclosure further provides a network device 70. The network device includes a processor 71, a transceiver 72, a storage 73, and a program stored on the storage 73 and executable by the processor 71, wherein, the transceiver 72 is connected to the processor 71 and the storage 73 via a bus interface, and the processor 71 is configured for reading the program in the storage to perform following: receiving, through the transceiver 72, first notification information sent by a terminal; performing transmission processing on a first logical channel of the terminal according to the first notification message.

It should be noted that in FIG. 7, a bus architecture may include any number of interconnected buses and bridges, and connects various circuits including one or more processors represented by the processor 71 and a storage represented by the storage 73. The bus architecture may also connect various other circuits such as peripherals, voltage regulators and power management circuits, which are well known in the art. Therefore, a detailed description thereof is omitted herein. A bus interface provides an interface. The transceiver 72 may be multiple elements, including a transmitter and a receiver, to allow for communication with various other apparatuses on the transmission medium. For different terminals, the processor 71 is responsible for supervising the bus architecture and normal processing and the storage 73 may store the data being used by the processor 71 during operation.

Specifically, when the processor executes the program, the processor implements at least one of the following: notifying the terminal to activate a Packet Data Convergence Protocol layer data replication function (PDCP replication) for the first logical channel; starting uplink repetitive transmissions; adopting a lower Modulation and Coding Scheme (MCS) level; or increasing a transmission power.

Optionally, when the processor executes the program, the processor implements the following: receiving, through the transceiver 72, second notification information sent by the terminal; stopping the transmission processing on the first logical channel of the terminal according to the second notification message.

Embodiments of the present disclosure also provide a computer-readable storage medium. The computer-readable storage medium has stored thereon a computer program, wherein when the computer program is executed by a processor, the processor implements steps of a method of processing transmission applied to a network device.

Figure 8:
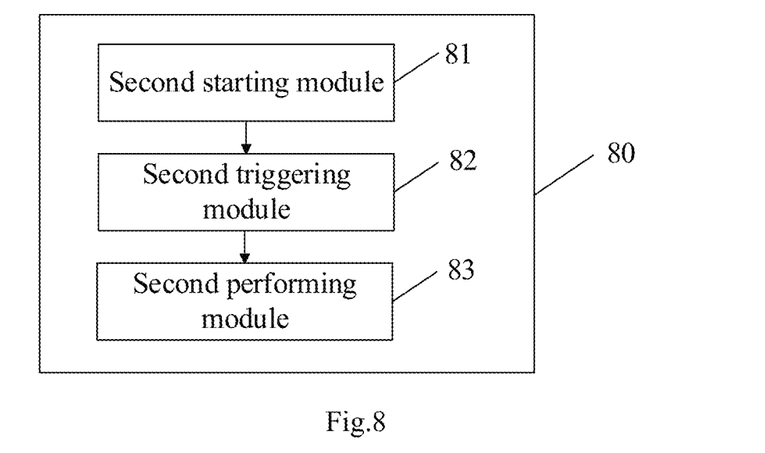
FIG. 8 shows a second block diagram of a network device according to an embodiment of the present disclosure.

As shown in FIG. 8, an embodiment of the present disclosure provides a network device 80. The network device 80 includes a second starting module 81, a second triggering module 82, and a second performing module 83.

The second starting module 81 is configured for, when a Media Access Control (MAC) layer of a network device receives a data packet from a second logical channel and data packets from the second logical channel correspond to H second processes, starting a third timer or a second counter for each of the second processes, wherein, H≥1.

The second triggering module 82 is configured for triggering starting of a fourth timer when the third timer expires or the second counter reaches a second preset value.

The second performing module 83 is configured for performing transmission processing on the second logical channel when at least one fourth timer is running.

In particular, the second logical channel is a logical channel having a survival time requirement.

Further, the timing duration of the third timer is determined by one of the following: determining according to a Packet Delay Budget (PDB) corresponding to the second logical channel; determining according to a core network latency and an end-to-end latency corresponding to the second logical channel; or determining according to the core network latency, the end-to-end latency and a jitter corresponding to the second logical channel.

Further, the condition of restarting the third timer includes at least one of the following conditions: receiving, by the network device, a Hybrid Automatic Repeat reQuest (HARD) acknowledgement response feedback for the second process; if a data packet is transmitted using a pre-configured resource, a timer for the pre-configured resource expires; or obtaining a Physical Downlink Control Channel (PDCCH) scheduling signaling for the second process, wherein a new data indicator (NDI) included in the PDCCH scheduling signaling is inversed.

Further, a count value length of the second counter is determined by one of the following: determining according to a packet delay budget corresponding to the second logical channel; determining according to a core network latency and an end-to-end latency corresponding to the second logical channel; or determining according to the core network latency, the end-to-end latency and the jitter corresponding to the second logical channel.

Further, the second counter is maintained based on a transport block of the second process, and manners for the maintenance include at least one of the following: an initial value of the second counter is 0, and a value of the second counter is incremented by 1 every time a transport block of the second process is transmitted once; or an initial value of the second counter is N, and a value of the second counter is decremented by 1 every time a transport block of the second process is transmitted once, wherein N is a second preset value, N≥1.

Specifically, the second performing module 83 executes at least one of the following: activating a Packet Data Convergence Protocol layer data replication function (PDCP replication) for the second logical channel; starting downlink repetitive transmissions; adopting a lower Modulation and Coding Scheme (MCS) level; or increasing a transmission power.

It should be noted that the embodiment of the network device is a network device corresponding to the method embodiment described above, and all the implementations in the method embodiment are applicable to the embodiment of the network device. The same technical effect can be achieved.

Figure 9:
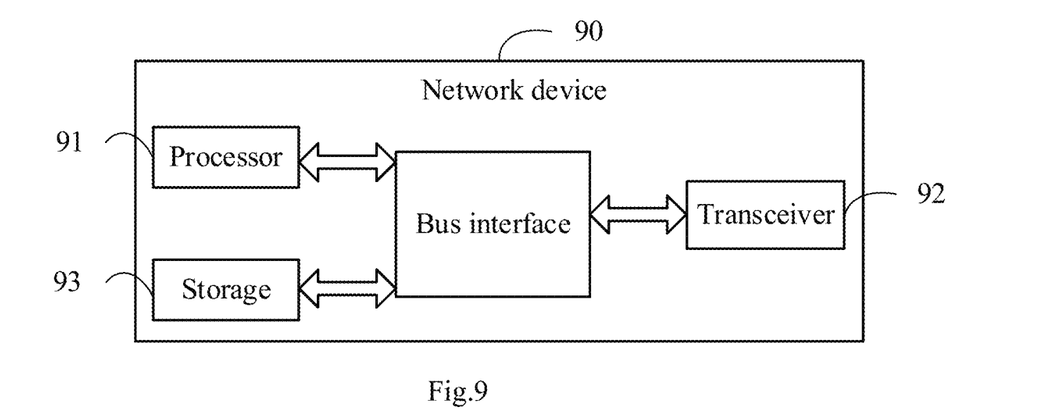
FIG. 9 shows a second structural diagram of a network device according to an embodiment of the present disclosure.

As shown in FIG. 9, an embodiment of the present disclosure also provides a network device 90. The network device 90 includes a processor 91, a transceiver 92, a storage 93, and a program stored on the storage 93 and executable by the processor 91, wherein, the transceiver 92 is connected to the processor 91 and the storage 93 via a bus interface, the processor 91 is configured for reading the program in the storage perform the following: when a Media Access Control (MAC) layer of a network device receives a data packet from a second logical channel and data packets from the second logical channel correspond to H second processes, starting a third timer or a second counter for each of the second processes, wherein H≥1; triggering starting of a fourth timer when the third timer expires or the second counter reaches a second preset value; performing transmission processing on the second logical channel when at least one fourth timer is running.

It should be noted that in FIG. 9, a bus architecture may include any number of interconnected buses and bridges, and connects various circuits including one or more processors represented by the processor 91 and a storage represented by the storage 93. The bus architecture may also connect various other circuits such as peripherals, voltage regulators and power management circuits, which are well known in the art. Therefore, a detailed description thereof is omitted herein. A bus interface provides an interface. The transceiver 92 may be multiple elements, including a transmitter and a receiver, to allow for communication with various other apparatuses on the transmission medium. For different terminals, the processor 91 is responsible for supervising the bus architecture and normal processing and the storage 93 may store the data being used by the processor 91 during operation.

In particular, the second logical channel is a logical channel having a survival time requirement.

Further, the timing duration of the third timer is determined by one of the following: determining according to a Packet Delay Budget (PDB) corresponding to the second logical channel; determining according to a core network latency and an end-to-end latency corresponding to the second logical channel; or determining according to the core network latency, the end-to-end latency and a jitter corresponding to the second logical channel.

Further, the condition of restarting the third timer includes at least one of the following conditions: receiving, by the network device, a Hybrid Automatic Repeat reQuest (HARD) acknowledgement response feedback for the second process; if a data packet is transmitted using a pre-configured resource, a timer for the pre-configured resource expires; or, obtaining a Physical Downlink Control Channel (PDCCH) scheduling signaling for the second process, wherein a new data indicator (NDI) included in the PDCCH scheduling signaling is inversed.

Further, a count value length of the second counter is determined by one of the following: determining according to a packet delay budget corresponding to the second logical channel; determining according to a core network latency and an end-to-end latency corresponding to the second logical channel; or determining according to the core network latency, the end-to-end latency and the jitter corresponding to the second logical channel.

Further, the second counter is maintained based on a transport block of the second process, and manners for the maintenance include at least one of the following: an initial value of the second counter is 0, and a value of the second counter is incremented by 1 every time a transport block of the second process is transmitted once; or an initial value of the second counter is N, and a value of the second counter is decremented by 1 every time a transport block of the second process is transmitted once, wherein N is a second preset value, N≥1.

Specifically, when the processor executes the program, the processor implements at least one of the following: activating a Packet Data Convergence Protocol layer data duplication function (PDCP duplication) for the second logical channel; starting downlink repetitive transmissions; adopting a lower Modulation and Coding Scheme ((MCS) level; or increasing a transmission power.

The network device may be a Base Transceiver Station (BTS) in Global System of Mobile Communication (GSM) or a Code Division Multiple Access (CDMA) system, or may also be a base station (NodeB, abbreviated as NB) in a Wideband Code Division Multiple Access (WCDMA) system, or an Evolutional Node B (abbreviated as eNB or eNodeB) in LTE, or a relay station or an access point, or a base station ng-NB (Next Generation Node B) or a Central Unit (CU) in a future 5G network. The present disclosure is not limited thereto.

Embodiments of the present disclosure also provide a computer-readable storage medium. The computer-readable storage medium has stored thereon a computer program, wherein when the computer program is executed by a processor, the processor implements the steps of a method of processing transmission applied to a network device.

It may be understood that these embodiments described in embodiments of the present disclosure may be implemented by hardware, software, firmware, middleware, microcode or a combination thereof. For hardware implementation, various modules, units, sub-units or sub-modules may be implemented in one or more of Application Specific Integrated Circuits (ASIC), a Digital Signal Processor (DSP), a DSP device (DSPD), a Programmable Logic Device (PLD), a Field-Programmable Gate Array (FPGA), a general-purpose processor, a controller, a microcontroller, a microprocessor, other electronic units configured to perform the functions in the present disclosure or a combination thereof.

For a software implementation, the techniques described in embodiments of the present disclosure may be implemented by modules (for example, processes or functions) performing the functions described in embodiments of the present disclosure. Software codes may be stored in a storage and executed by a processor. The storage may be implemented internal or external to a processor. Such terms as "first", "second", etc. in the specification and claims of the present application are used to distinguish similar objects and are not necessarily used to describe a particular order or a precedence order. It should be understood that terms used in this way may be interchanged where appropriate, so that the embodiments of the present application described herein, for example, can be implemented in an order other than those illustrated or described herein. Furthermore, such terms as "comprising", "including", "having", and any variations thereof, are intended to cover non-exclusive inclusion. For example, a process, a method, a system, a product or a device including a series of steps or units need not be limited to those steps or units that are clearly listed, but may include other steps or elements that are not explicitly listed or inherent to these processes, methods, products or devices. In the specification and the claims, "and/or" means at least one of objects being connected by this expression, such as A and/or B and/or C means A exists alone, B exists alone, C exists alone, and both A and B exist, both B and C exist, both A and C exist, and all of A, B and C exist. Similarly, "at least one of A and B" or "at least one of A or B" as used in this specification and in the claims should be understood as "A exists alone, B exists alone, or both A and B exists".

The foregoing describes optional embodiments of the present disclosure, and it should be noted that a number of modifications and embellishments may be made by those of ordinary skill in the art without departing from the principle set forth in this disclosure, such modifications and embellishments are also within the protection scope of the present disclosure.

What is claimed is:

1. A method of processing transmission, applied to a terminal, comprising:
   starting a first timer or a first counter for each of K first processes when a Media Access Control (MAC) layer of the terminal receives a data packet from a first logical channel and data packets from the first logical channel correspond to the K first processes, wherein k≥1; triggering starting of a second timer when the first timer expires or the first counter reaches a first preset value; sending first notification information to a network device when at least one second timer is running, wherein the first notification information is used to instruct the network device to perform transmission processing on a first logical channel; and performing transmission processing on the first logical channel, wherein performing the transmission processing on the first logical channel comprises at least one of the following: activating a Packet Data Convergence Protocol layer data replication function for the first logical channel; starting uplink repetitive transmissions; adopting a lower Modulation and Coding Scheme (MCS) level; or increasing a transmission power; or starting a first timer or a first counter for each of K first processes when a Media Access Control (MAC) layer of the terminal receives a data packet from a first logical channel and data packets from the first logical channel correspond to the K first processes, wherein k≥1; triggering starting of a second timer when the first timer expires or the first counter reaches a first preset value; and performing transmission processing on the first logical channel when at least one second timer is running, wherein performing the transmission processing on the first logical channel comprises at least one of the following: activating a Packet Data Convergence Protocol layer data replication function for the first logical channel; starting uplink repetitive transmissions; adopting a lower Modulation and Coding Scheme (MCS) level; or increasing a transmission power.

2. The method of processing transmission according to claim 1, wherein,
a condition of restarting the first timer comprises at least one of following conditions:
receiving, by the terminal, a Hybrid Automatic Repeat reQuest (HARD) acknowledgement response feedback for the first process;
if the data packet is transmitted using a pre-configured resource, a timer for the pre-configured resource expires; or
receiving, by the terminal, a Physical Downlink Control Channel (PDCCH) scheduling signaling for the first process, wherein a new data indicator (NDI) comprised in the PDCCH scheduling signaling is inversed.

3. The method of processing transmission according to claim 1, wherein the first logical channel is a logical channel having a survival time requirement.

4. The method of processing transmission according to claim 1, wherein a timing duration of the first timer is determined by one of the following:
determining according to a Packet Delay Budget corresponding to the first logical channel;
determining according to a core network latency and an end-to-end latency corresponding to the first logical channel; or
determining according to the core network latency, the end-to-end latency and jitter corresponding to the first logical channel.

5. The method of processing transmission according to claim 1, wherein a count value length of the first counter is determined by one of the following:
determining according to a packet delay budget corresponding to the first logical channel;
determining according to a core network latency and an end-to-end latency corresponding to the first logical channel; or
determining according to the core network latency, the end-to-end latency and jitter corresponding to the first logical channel.

6. The method of processing transmission according to claim 1, wherein
the first counter is maintained based on a transport block of the first process, and manners for the maintenance comprise at least one of following:
an initial value of the first counter is 0, and a value of the first counter is incremented by 1 every time a transport block of the first process is transmitted once; or an initial value of the first counter is M, and a value of the first counter is decremented by 1 every time a transport block of the first process is transmitted once, wherein M is a first preset value, M≥1.

7. The method of processing transmission according to claim 1, wherein, when sending the first notification information to the network device while at least one second timer is running, the method further comprises:
sending second notification information to the network device if all second timers stop running;
wherein the second notification information is used for instructing the network device to stop performing the transmission processing on the first logical channel.

8. A method of processing transmission, applied to a network device, comprising:
receiving first notification information sent by a terminal;
performing transmission processing on a first logical channel of the terminal according to the first notification information,
wherein in response to starting a first timer or a first counter for each of K first processes when a Media Access Control (MAC) layer of the terminal receives a data packet from a first logical channel and data packets from the first logical channel correspond to the K first processes, and in response to triggering starting of a second timer when the first timer expires or the first counter reaches a first preset value, and when at least one second timer is running, the first notification information is sent by the terminal, wherein k≥1, and
wherein performing the transmission processing on the first logical channel comprises at least one of the following: notifying the terminal to activate a Packet Data Convergence Protocol layer data replication function for the first logical channel; starting uplink repetitive transmissions; adopting a lower Modulation and Coding Scheme (MCS) level; or increasing a transmission power.

9. The method of processing transmission according to claim 8, wherein after performing the transmission processing on the first logical channel of the terminal according to the first notification information, the method further comprises:
receiving second notification information sent by the terminal;
stopping the transmission processing on the first logical channel of the terminal according to the second notification information.

10. A method of processing transmission, applied to a network device, comprising:
when a Media Access Control (MAC) layer of the network device receives a data packet from a first logical channel and data packets from the first logical channel correspond to H first processes, starting a first timer or a first counter for each first process of the H first processes, wherein, H≥1;
triggering starting of a second timer when the first timer for the each first process expires or the first counter for the each first process reaches a first preset value;
performing transmission processing on a first logical channel when at least one second timer is running,
wherein performing the transmission processing on the first logical channel comprises at least one of the following:
activating a Packet Data Convergence Protocol layer data replication function for the first logical channel;
starting downlink repetitive transmissions;

adopting a lower Modulation and Coding Scheme (MCS) level; or increasing a transmission power.

11. The method of processing transmission according to claim 10, wherein, a condition of restarting the first timer comprises at least one of the following conditions:

receiving, by the network device, a Hybrid Automatic Repeat reQuest (HARD) acknowledgement response feedback for the first process;

if a data packet is transmitted using a pre-configured resource, a timer for the pre-configured resource expires; or obtaining a Physical Downlink Control Channel (PDCCH) scheduling signaling for the first process, wherein a new data indicator (NDI) comprised in the PDCCH scheduling signaling is inversed.

12. The method of processing transmission according to claim 10, wherein the first logical channel is a logical channel having a survival time requirement.

13. The method of processing transmission according to claim 10, wherein a timing duration of the first timer is determined by one of the following:

determining according to a Packet Delay Budget (PDB) corresponding to the first logical channel;

determining according to a core network latency and an end-to-end latency corresponding to the first logical channel; or determining according to the core network latency, the end-to-end latency and a jitter corresponding to the first logical channel.

14. The method of processing transmission according to claim 10, wherein a count length of the first counter is determined by one of the following:

determining according to a packet delay budget corresponding to the first logical channel;

determining according to a core network latency and an end-to-end latency corresponding to the first logical channel; or determining according to the core network latency, the end-to-end latency and the jitter corresponding to the first logical channel.

15. The method of processing transmission according to claim 10, wherein the first counter is maintained based on a transport block of the first process, and manners for the maintenance comprise at least one of the following:

an initial value of the first counter is 0, and a value of the first counter is incremented by 1 every time a transport block of the first process is transmitted once; or an initial value of the first counter is N, and a value of the first counter is decremented by 1 every time a transport block of the first process is transmitted once, wherein N is a second preset value, $N \geq 1$.

16. A terminal, comprising:

a storage, a processor and a program stored on the storage and executable by the processor, wherein the processor is configured to execute the program to implement steps of the method of processing transmission according to claim 1.

17. A network device, comprising:

a transceiver, a storage, a processor and a program stored on the storage and executable by the processor, wherein the processor is configured to execute the program to implement steps of the method of processing transmission according to claim 10.

* * * * *